United States Patent
Martin-Neira et al.

(10) Patent No.: US 6,529,158 B2
(45) Date of Patent: Mar. 4, 2003

(54) APERTURE SYNTHESIS RADIOMETER AND METHOD OF CONTROLLING SAME

(75) Inventors: Manuel Martin-Neira, Oegstgeest (NL); Quiterio Garcia, Madrid (ES)

(73) Assignee: Agence Spatiale Europeenne, Paris Cedex (FR)

( * ) Notice: Subject to any disclaimer, the term of this patent is extended or adjusted under 35 U.S.C. 154(b) by 0 days.

(21) Appl. No.: 09/910,490

(22) Filed: Jul. 19, 2001

(65) Prior Publication Data

US 2002/0093450 A1 Jul. 18, 2002

(30) Foreign Application Priority Data

Jul. 24, 2000 (FR) .......................................... 00 09652

(51) Int. Cl.$^7$ ................................................ G01S 3/02
(52) U.S. Cl. ........................ 342/351; 342/374; 342/362
(58) Field of Search ................................ 342/351, 374, 342/378, 361, 362, 363, 364, 365, 366

(56) References Cited

U.S. PATENT DOCUMENTS 4,978,962 A * 12/1990 Hisada et al. ............... 342/351
5,608,411 A * 3/1997 Rose ........................... 342/417
5,724,044 A   3/1998 Tanaka ........................ 342/351
6,307,502 B1 * 10/2001 Marti-Canales et al. .... 342/351

OTHER PUBLICATIONS

Martin–Neira et al., "MIRAS—A Two–Dimensional Aperture–Synthesis Radiometer for Soil–Moisture and Ocean–Salinity Observations," XP–000732088, eesa bulletin 92, Nov. 1997, pp. 95–104.

* cited by examiner

Primary Examiner—Theodore M. Blum
(74) Attorney, Agent, or Firm—Barry R. Lipsitz

(57) ABSTRACT

An aperture synthesis radiometer operating in fully polarimetric mode. The measuring receivers are connected selectively to the polarization ports of the array elements following selected switching sequences thereby to provide the required cross-correlations that allow fully polarimetric operation. The polarization switching scheme used enable measurements to be performed with a minimum degradation in sensitivity using single channel receivers.

7 Claims, 5 Drawing Sheets

CONFIGURATION    SWITCHING SEQUENCES 0011    0101    1001

(a)

(b)

(c) 
    c-1        c-2        c-3        c-4

(d) 
    d-1        d-2        d-3        d-4

APERTURE SYNTHESIS RADIOMETER AND METHOD OF CONTROLLING SAME

BACKGROUND OF THE INVENTION

The present invention relates to aperture synthesis radiometers or interferometric radiometers and in particular to a switching scheme for the control of the operation of such radiometers.

Aperture synthesis radiometers are measuring apparatus arranged to synthesise a large aperture using small antenna elements receiving the measuring wave signals and cross-correlating the signals of all pairs. Each antenna element is connected to a receiver arranged to receive the components of the horizontal and vertical electrical field of the antenna element. Normally the antenna of an aperture synthesis radiometer is not mechanically scanned and hence, since its field of view is very wide, the horizontal and vertical polarizations at a given point of the ground do not correspond with the horizontal and vertical polarization of the antenna axes. The result is that the h and v electric field components of the antenna contain each a combination of the H and V field components on the ground and therefore the cross-correlation between the antenna elements of the h or v fields provides the Fourier Transform of a combination of the brightness temperatures which define the Stokes vector, that is, the brightness temperature in linear polarization along H, V and ±45° from H, and in circular left- and right-hand polarizations.

It is generally assumed that the contributions of the wave components at ±45° from H (third Stokes parameter) as well as the circular left- and right-hand polarizations (fourth Stokes parameter) are negligible and that the brightness temperature at H and V polarizations can be extracted by linear inversion from the h and v sets of cross-correlations of the antenna fields.

However, during the last few years polarimetric radiometers have shown that the third and fourth Stokes parameters can in fact provide very useful information about the target. As an example, fully polarimetric radiometers are being used to retrieve wind over ocean based on the wind-driven correlation between the H and V electric field components. Another example is the MIRAS radiometer where the third and the fourth Stokes parameters have the potential to provide corrections due to wind for sea surface salinity or for Faraday rotation compensation over land.

If the fourth Stokes parameters are to be retrieved, then four measurements are needed. These are the cross-correlations between antenna elements i and j of the h and v electric fields in all the four possible combinations, that is, $(h_i\, h_j)$, $(h_i\, v_j)$, $(v_i\, h_j)$ and $(v_i\, v_j)$. When each antenna element receiver of the interferometer is provided with two parallel channels (one for horizontal polarization and one for vertical polarization) then it is simply a matter of having as many correlators as needed and getting the four sets of correlations desired. But this is not the usual situation one encounters in practice. Interferometric radiometers have a large number of elements and the receivers usually have only one channel in order to save mass and power consumption. Single channel receivers select sequentially the horizontal and vertical polarizations ports of the antenna by means of a switch and therefore it is only possible to perform one of the four correlations at any time, regardless of the number of correlators. The four correlations needed can be obtained by properly selecting the horizontal and vertical ports of each antenna element through an adequate switching sequence.

The obvious disadvantage of single channel receivers with sequential polarization switching as compared to dual channel receivers is a reduction of the integration time by a factor 4 at least and this degrades the radiometer sensitivity of the measurements by a factor 2 or more.

SUMMARY OF THE INVENTION

The object of the present invention is to provide a novel switching scheme for the signal receivers of an aperture synthesis radiometer with single channel signal receivers, so as to enable fully polarimetric operation of the radiometer.

According to the invention, switching sequences are selected, which are capable to select sequentially the array elements so that the output signals from the signal receivers can provide the four correlations to allow fully polarimetric operation of the radiometer. The switching sequences consist in at least four steps. A first switching sequence is assigned to a first signal receiver and a different switching sequence is assigned to each other signal receiver which defines a non-redundant baseline with said first signal receiver. Each remaining signal receiver is assigned a switching sequence such that each signal receiver of a distinct pair of signal receivers which define a non-redundant baseline is assigned a different switching sequence and such that each signal receiver of at least one distinct pair of signal receivers which define a redundant baseline is assigned a different switching sequence. Any of the selected switching sequences is assigned to the remaining signal receivers. Switch control signals indicating the switching sequences thus assigned are generated and applied to switch means operative to connect the signal receivers to the polarization ports of the array elements following the assigned switching sequences.

The polarization switching scheme of this invention is the shortest possible and thus achieves the minimum degradation in sensitivity as compare to dual channel interferometric polarimetric radiometers. The switching scheme is implemented in a switch control apparatus operative to control the switching operation in accordance with the selected switching sequences.

Another object of the present invention is to provide a single-channel aperture synthesis radiometer operating in a fully interferometric mode using the polarization switching scheme as outlined herein.

These and other objects and advantages of the present invention will become apparent from the following description and the accompanying drawings.

DESCRIPTION OF AN EMBODIMENT OF THE INVENTION

Figure 1:
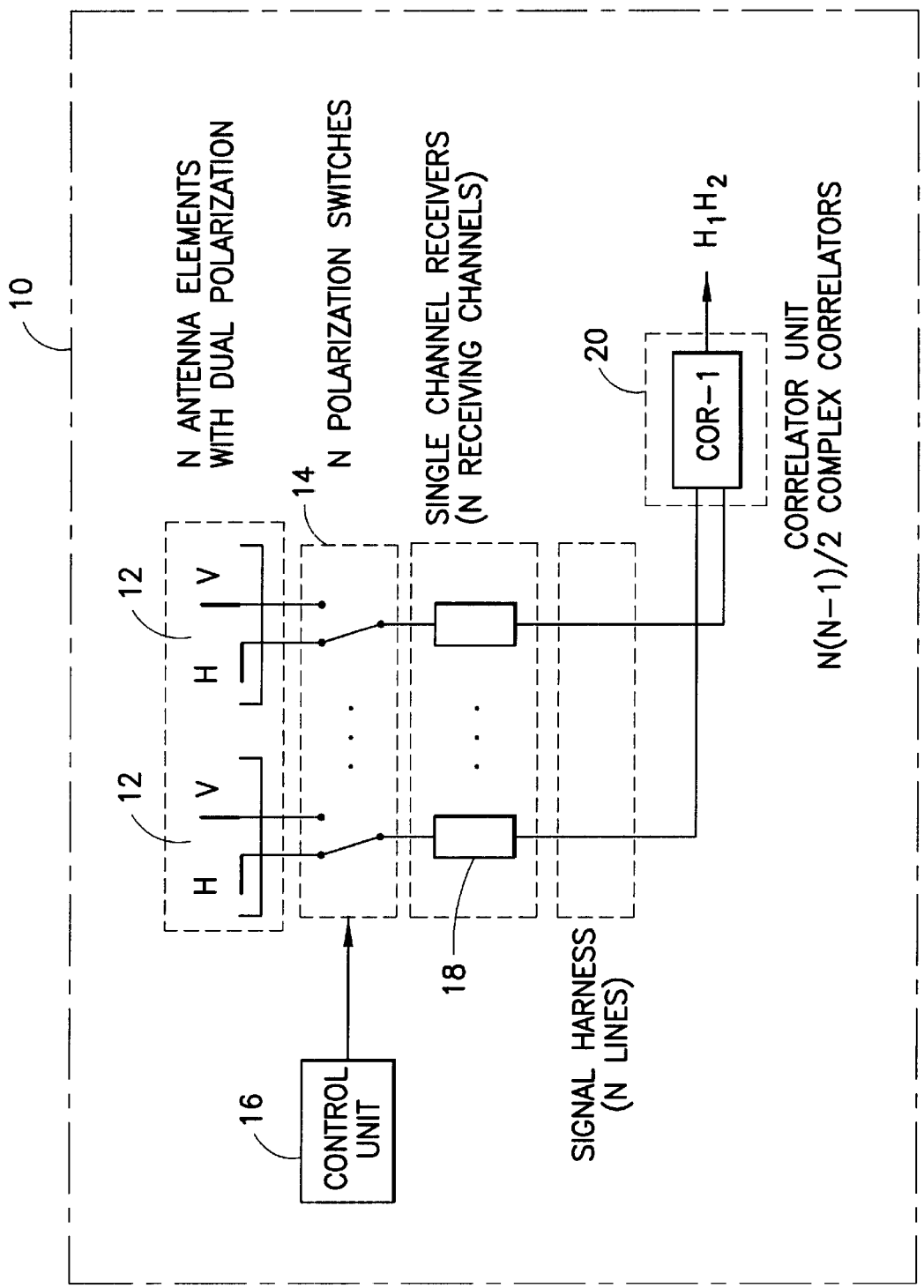
FIG. 1 schematically represents an interferometric radiometer to which the invention is applicable.

Referring to FIG. 1 there is schematically represented an aperture synthesis radiometer (also called interferometric radiometer) to which the polarization switching scheme of this invention is applicable. The radiometer 10 is formed by an arbitrary number of array elements 12 having horizontal polarization ports H and vertical polarization ports V. The polarization ports H and V are connected to a switching apparatus 14 which serves to select the polarization port to be connected to each of a plurality of single channel signal receivers 18. The switching apparatus 14 is controlled by a switch control unit 16. The output signals from all the receivers 18 are routed through a signal harness to a central correlator unit 20 which performs the required cross-correlations between all pairs of signal receivers.

One aspect of the present invention is a novel method of controlling the switching apparatus with a view to allow fully polarimetric operation of the radiometer using single channel receivers.

The method of the invention, called pol-switching, is based on the interferometric redundancy properties of the antenna elements placed at different locations within the same plane. A two-dimensional interferometer is formed by an arbitrary number of antenna elements. The set of antenna elements is referred to as the antenna array of the interferometric radiometer. In a given array geometric configuration, a baseline is defined as the relative position vector between any two elements, including the possibility that the two elements be the same element. Therefore, there are as many baselines as pairs of elements, including pairs formed by the same element. The number of baselines equals the square of the number of elements of the array. It is clear that the opposite of a particular baseline is also a baseline generated by a given array, since it corresponds to a permutation of the elements of the pair. For any arbitrary antenna array it is straightforward to derive the map of baselines it generates.

Figure 2:
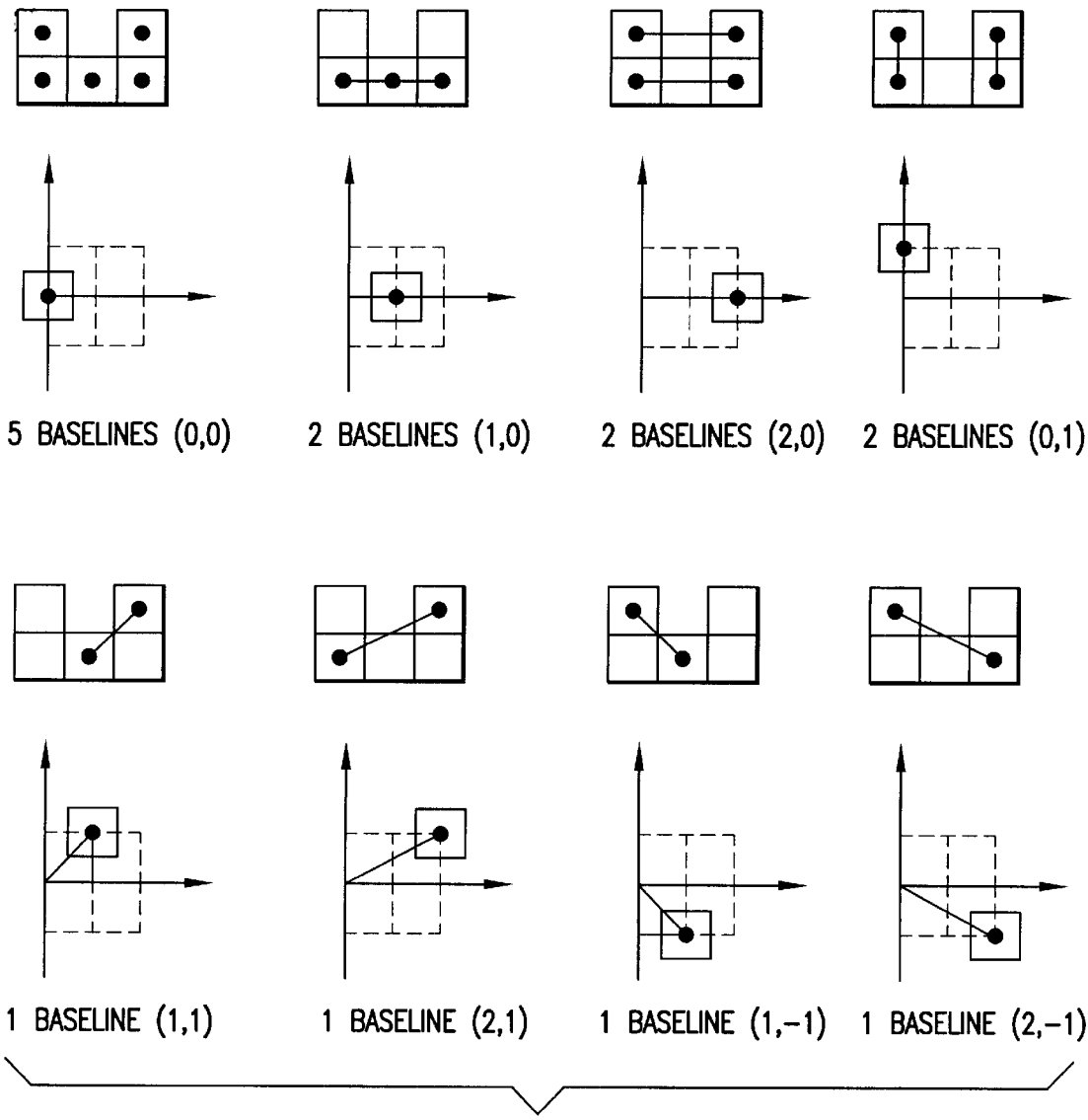
FIG. 2 shows the array pairs which are considered in accordance with the invention in an exemplary array geometry.
Figure 3:
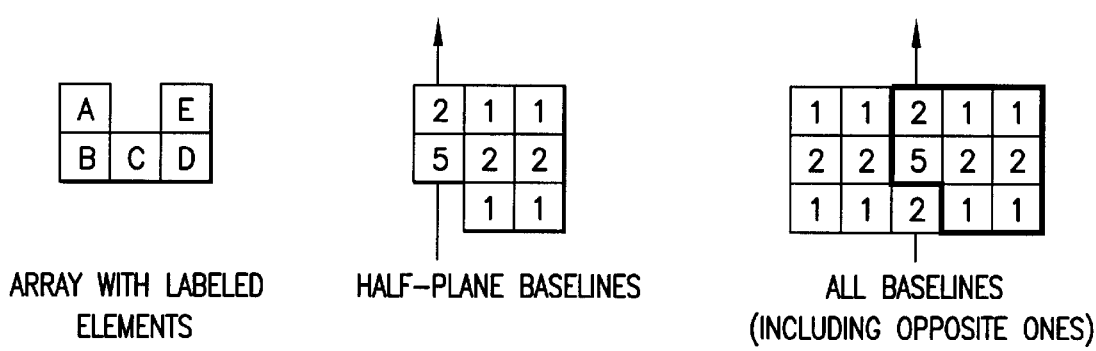
FIG. 3 shows the table of degree of redundancy of the baselines in the array geometry shown in FIG. 2.

FIG. 2 shows the baselines generated by an exemplary U-shape array including five elements. One baseline may correspond to more than one specific pair of array elements, that is, pairs of elements may differ by at least one array element. These baselines are said to be redundant. The number of different pairs of antenna elements which correspond to the same baseline is called the degree of redundancy of that particular baseline. FIG. 3 shows the table of degrees of redundancy of the baselines of the array configuration in FIG. 2. The degree of redundancy of the baselines are indicated inside the squares of the table. The degree of redundancy of the baseline (0,0)—that is the baseline formed by the same array element—is obviously equal to the number of elements of the array. The degrees of redundancy shown in the bordered right-hand portion of the table correspond to the baselines of the right-hand half-plane, the degrees of redundancy shown in the left-hand portion of the table correspond to the opposite baselines.

Given a particular array geometric configuration, the object is to control the polarization switching sequences which select the polarization ports of each array element so as to provide the polarization signals that allow retrieving the set of four correlations needed for the full polarimetric operation of the radiometer with single channel receivers. As stated herein before, the four correlations to be obtained are $(_i h_j)$, $(h_i v_j)$, $(v_{i\ j})$ and $(v_i v_j)$.

For non-redundant baselines, a four-step sequence is selected where each receiver has to be connected two times to the horizontal polarization port and two times to the vertical polarization port of the array element. Let us arbitrarily represent the selection of the horizontal polarization port by 0 and the selection of the vertical polarization port by 1. Then there are only three possible switching sequences for any receiver of the interferometer to generate non-redundant baselines which select the horizontal and vertical polarization ports twice:

$\alpha=0011$ $\beta=0101$ $\gamma=1001$

Of course, the inversions of these three sequences, viz. $\bar{\alpha}=1100$, $\bar{\beta}=1010$ and $\bar{\gamma}=0110$ are also valid switching sequences.

For non-redundant baselines, it is clear that the four correlations 00, 01, 10 and 11 are obtained only if the pair of receivers being correlated are switched using a different sequence. For example, when a receiver that is switched following a sequence $\alpha$ is being correlated with a receiver which is switched following a sequence $\beta$, the four correlations required are indeed obtained, but cross correlating two receivers connected following a same sequence $\alpha$ gives only two correlations, viz. 00 and 11. Thus, the valid four-step sequence combinations to allow polarimetric operation of non-redundant baselines are:

$\alpha\beta \quad \alpha\gamma \quad \beta\gamma$ $\bar{\alpha}\beta \quad \bar{\alpha}\gamma \quad \bar{\beta}y$ $\alpha\bar{\beta} \quad \alpha\bar{\gamma} \quad \beta\bar{\gamma}$ $\bar{\alpha}\bar{\beta} \quad \bar{\alpha}\bar{\gamma} \quad \bar{\beta}\bar{\gamma}$ The table above shows that a sequence can be replaced by its inverted sequence without any impact. Therefore, a sequence and its inverted sequence are not considered to be different switching sequences.

For redundant baselines, the switching sequences and the combinations thereof as shown above are possible and this increases significantly the number of possibilities. For example, the receivers of a baseline with degree of redundancy 4 or greater could even be switched in the trivial sequences 0000 and 1111. However, the most interesting arrays are those with low redundancy, that is arrays where every receiver contributes to at least one non-redundant baseline and in which most of the baselines are non-redundant. For this reason, for every redundant baseline at least one pair of receivers shall be considered as if it generated a non-redundant baseline, even if this is not the case. This rule is arbitrarily imposed to arrive easily to practical solutions out of the set of all possible configurations.

A radiometer with three array elements each switched following one of the three switching sequences $\alpha$, $\beta$ and $\gamma$ above can achieve fully polarimetric operation at the end of the four-step sequence. If a fourth array element is added then it has to be switched following the same switching sequence as one of the other three array elements and the corresponding baseline will provide only two correlations. Depending on whether that baseline is redundant or not, the polarimetric mode is or is not achieved.

A general conclusion is that fully polarimetric operation of a radiometer with more than three array elements using a four-switching sequence may or may not be achieved depending on the redundancies. Receivers that are to be switched following the same switching sequence must belong to redundant baselines. Receivers belonging to non-redundant baselines must be switched following different switching sequences. These conditions are both necessary but not sufficient. Sufficiency can only be studied case by case for the particular geometry of a given interferometer. The baseline (0,0) must also be polarimetric, which means necessarily to have at least one dual fully polarimetric element in every array to measure the zero baseline.

Based on the above, the control unit 16 is arranged so that it is operative to select the appropriate switching sequences for every switch of the switching apparatus 14 for each particular array geometric configuration.

Figure 4:
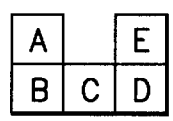
FIG. 4 represents a U-shape array geometry considered for describing the derivation of the switching sequence of the invention.
Figure 4:
Figure 4:
Figure 4:
Figure 4:
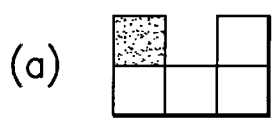
Figure 4:
Figure 4:
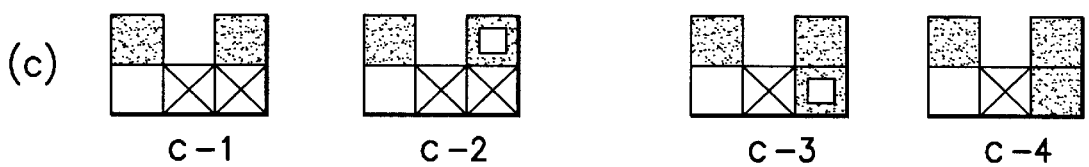
Figure 4:
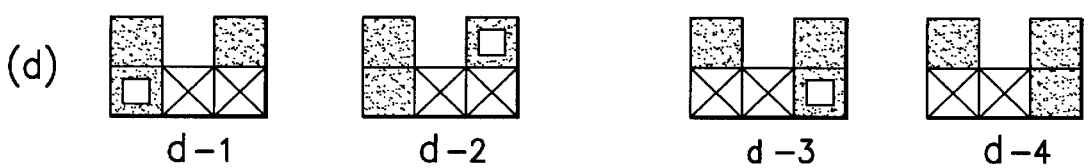

Let us consider, for instance, the U-shape array configuration shown in FIG. 4. The array includes five elements A, B, C, D, E. Baselines formed by receivers on the same arm are redundant (except for the longest baseline in the direction of the arm). Thus, the receivers on one arm can be assigned the same switching sequence except the first and the last. Non-redundant baselines are produced generally by pairs of receivers each belonging to a different arm (but not always, as in a ten-element U-shape array where redundant baselines are generated from receivers belonging to the parallel arms). Therefore, receivers from different arms must generally be assigned a different switching sequence. The switching sequence of the elements or elements at the arms crossings has to be selected for each particular case to ensure that redundant baselines do achieve polarimetric operation too.

According to the invention, the switching sequences consist in four steps at least to ensure a fully polarimetric operation. Assuming that every receiver of the interferometer contributes to at least one non-redundant baseline and given the three different switching sequences $\alpha$, $\beta$ and $\gamma$ noted above, the switching method is implemented as follows:

1) for every non-redundant baseline, assigning a different switching sequence to the corresponding pair of receivers;

2) for every redundant baseline, assigning a different switching sequence to at least one pair of receivers and the same or a different switching sequence to the other pairs of receivers contributing to the same redundant baseline.

The above rules are to be applied taking into account that a switching sequence and its inverted sequence are not considered to be different switching sequences (e.g. sequence $\overline{\alpha}$ is not a different sequence to sequence $\alpha$).

Assuming an array of N elements, the pol-switching method of the invention compares to a dual channel interferometric polarimetric radiometer as follows:

1) It requires only N receiving channels (half of a dual channel radiometer),

2) It requires only N lines in the signal harness (half of a dual channel radiometer), 3) It requires only N(N−1)/2 complex correlators (one quarter of a dual channel radiometer), 4) It achieves a reduced integration time and the minimum degradation in sensitivity (a factor of 2).

As compared to other switching schemes, the pol-switching of the invention is optimum: it allows polarimetric operation with the shortest possible sequence. Therefore, of all possible switching schemes, the pol-switching of the invention achieves the minimum degradation in sensitivity.

The method of the invention is applicable to a plurality of array geometric configurations, e.g. U-shape, L-shape, T-shape, A-shape, Y-shape arrays. In the following there is described the application to the U-shape array shown in FIG. 4, including five elements A, B, C, D and E. It is to be understood that the number of elements is irrelevant. The polarization ports of the five elements must be switched sequencially to an equal number of receivers which are denoted herein after by the same letters than the corresponding array elements.

Let us start by assigning arbitrarily switching sequence $\alpha$ to receiver A as shown in FIG. 4a. The same sequence cannot be assigned to receivers C and D because the baselines AC (1,−1) and AD (2,−1) are non-redundant (Rule 1). So let us assign sequence $\beta$ to receiver C. Then receiver D can be assigned sequence $\beta$ or $\gamma$ since baseline CD=(1,0) is redundant (Rule 2). The two possibilities are shown in FIG. 4b.

Receiver E cannot be assigned sequence $\beta$ because the baseline CE=(1,1) is non-redundant (Rule 1). So receiver E can be assigned sequence $\alpha$ (allowed because baseline AE=(2,0) is redundant ) or sequence $\gamma$ (allowed because baseline DE=(0,1) is redundant, regardless of the sequence assigned to receiver D.

If receiver D is assigned sequence $\beta$ and receiver E is assigned sequence $\alpha$, then receiver B must be assigned sequence $\gamma$ (FIG. 4c-1). If receiver B were assigned $\beta$, rule 1 would not be complied for the non-redundant baseline BE=(2,1). If receiver B were assigned sequence $\beta$, then rule 2 would not be complied because none of the redundant baselines BC=CD=(1,0) nor AE=BD=(2,0) would be assigned a different sequence (BC and CD would be $\beta\beta$, AE would be $\alpha\alpha$ and BD would be $\beta\beta$).

If receiver D is assigned sequence $\beta$ and receiver is assigned sequence $\gamma$ (FIG. 4c-2) then receiver B must be assigned sequence $\alpha$ (FIG. 4d-2). If receiver B would be assigned $\gamma$, rule 1 would not be complied for the non-redundant baseline BE=(2,1). If receiver B were assigned $\beta$ then rule 2 would not be complied because none of the redundant baselines BC=CD=(1,0) would be assigned a different sequence (BC and CD would be both $\beta\beta$).

If receiver D is assigned sequence $\gamma$ and if receiver E is assigned sequence $\alpha$ (FIG. 4c-3) then receiver B must be assigned sequence $\beta$ (FIG. 4d-3). If receiver B were assigned $\gamma$ then rule 2 would not be complied because none of the redundant baselines AE=BD=(2,0) would be assigned a different sequence (AE would be $\alpha\alpha$ and BD would be $\gamma\gamma$).

If both receivers D and E are assigned sequence $\gamma$ (FIG. 4c-4) then receiver B must be assigned sequence $\beta$ (FIG. 4d-4). If receiver B were be assigned $\gamma$, rule 1 would not be complied for non-redundant baseline BE=(2,1). If receiver B were be assigned $\alpha$, then rule 2 would not be complied because none of the redundant baselines AB=DE=(0,1) would be assigned a different sequence (AB would be $\alpha\alpha$ and DE would be $\gamma$).

Since a switching sequence and its inverted sequence are not considered to be different sequences in the application of the pol-switching method of the invention, then any replacement of one or several sequences by their inverted ones in any of the steps disclosed herein before gives also a valid switching scheme for the exemplary array. Further, any permutation of the sequences $\alpha\beta\gamma$ obviously provides a valid solution. For example, the sequence combination $\alpha\beta\gamma$ could be replaced by any of the following alternative combinations: $\beta\alpha\gamma$, $\beta\gamma\alpha$, $\alpha\gamma\beta$, $\gamma\alpha\beta$ and $\gamma\beta\alpha$. It is thus clear that given an array geometry, there exist many different embodiments of the invention which provide valid solutions complying with the pol-switching rules stated herein before.

As stated earlier herein, the invention is applicable to a plurality of array geometries. FIGS. 5–9 illustrate the application to some typical geometries. The solutions shown are not unique as explained herein before, but among all the possibilities they present some advantages in terms of simplicity. It is worth of note that the assumption of the pol-switching, namely that every receiver contributes to at least one non-redundant baseline, is fulfilled in all these typical cases. Each figure shows the mapping of pol-switching sequences across the array as well as the implementation of the four-step switching sequences for each arm of the array. For instance, the sequence denoted 0011 means that the receivers are connected successively to the following polarization ports of the array elements in the particular arm considered: an horizontal polarization port H, then an horizontal polarization port H, thereafter a vertical polarization port V and then a vertical polarization port V.

In these examples, any permutation of the valid sequences between arms and the junction elements in the arrays is of course also valid. The inverted versions of the valid switching sequences are valid as well.

Figure 5:
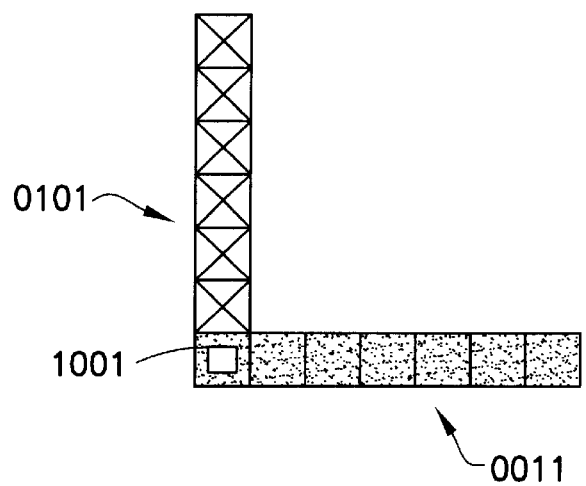
FIGS. 5–9 illustrate some typical array geometric configurations to which the switching scheme of the invention is applied.

FIG. 5 shows an L-shape array in which the arms 1 and 2 are connected to the receivers following the sequences α=0011 and β=0101, respectively. The corner element is connected to the receiver following the sequence γ=1001.

Figure 6:
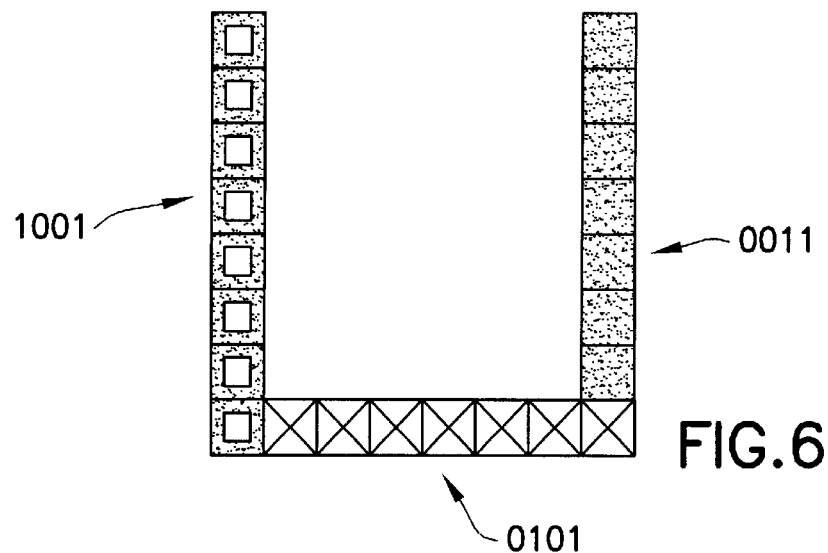

FIG. 6 shows an U-shape array in which the elements in arms 1, 2 and 3 are connected to the receivers following the sequences α=0011, β=0101 and γ=1001, respectively. The corner element of arms 1 and 2 is connected following the sequence β=0101 and the corner element of arms 2 and 3 are connected following the sequence γ=1001. The switching sequences for the two corner elements can be permuted.

Figure 7:
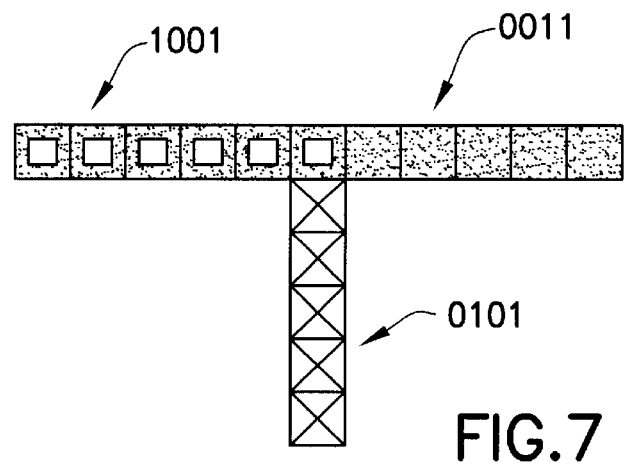

FIG. 7 shows a T-shape array in which the elements in arms 1, 2 and 3 are connected following the sequences α=0011, β=0101 and γ=1001, respectively. The junction element can be connected following the sequence α or following the sequence γ.

Figure 8:
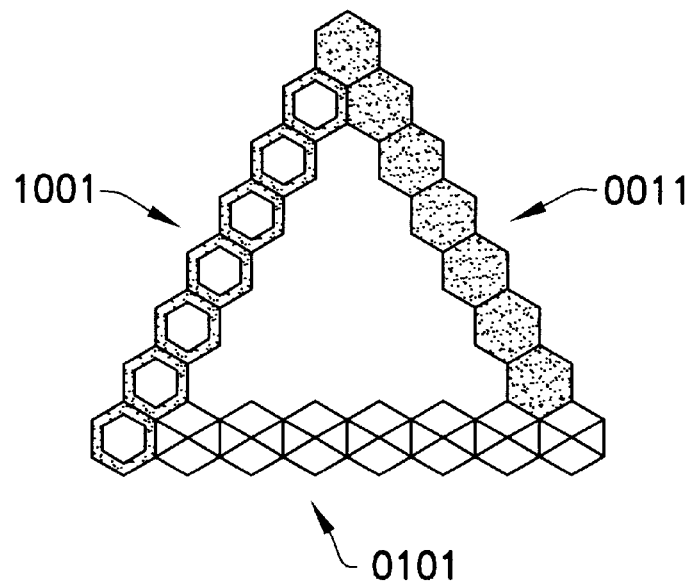

FIG. 8 shows a Δ-shape array in which the elements in arms 1, 2 and 3 are connected to the receivers following the sequences α=0011, γ=1001 and β=0101, respectively. The three corner elements are connected following any of the three sequences, permutation thereof being allowed.

Figure 9:
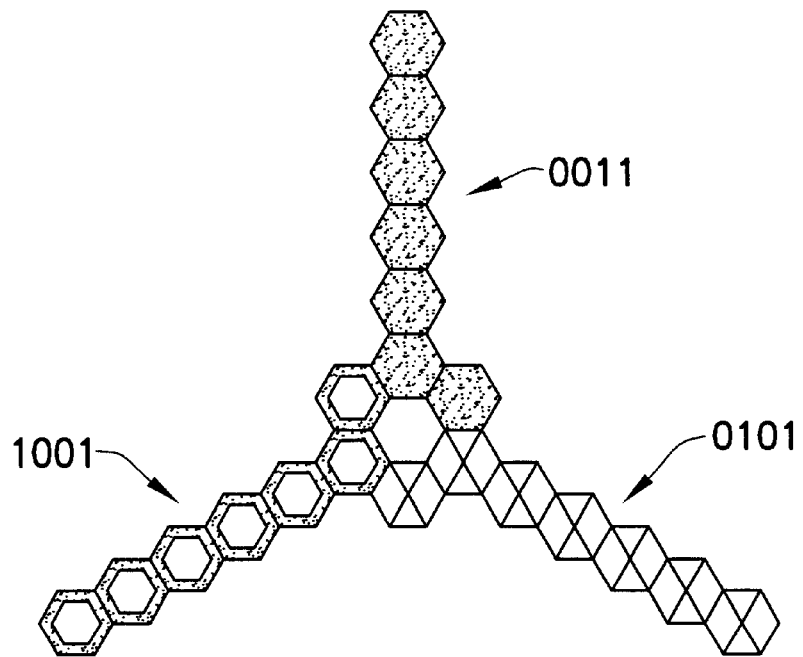

FIG. 9 shows a Y-shape array in which the elements in arms 1, 2 and 3 are connected to the receivers following the sequences α=0011, β=0101 and γ=1001, respectively. The corner element of arms 1 and 2 is connected following the sequence α=0011, the corner element of arms 2 and 3 is connected following the sequence γ=0101 and the corner element of arms 3 and 1 is connected following the sequence γ=1001. The switching sequences for the corner elements can be permuted but the sequence must be different for each corner element.

What is claimed is:

1. A method of controlling the connection of N signal receivers to the polarization ports of N array elements of an aperture synthesis radiometer, said array elements being placed at different locations with a predetermined geometric configuration, said geometric configuration defining non-redundant baselines and redundant baselines, the method comprising the steps of:
   (a) selecting switching sequences capable to select sequentially the array elements so that the output signals from the receivers can be cross-correlated thereby to allow fully polarimetric operation of the radiometer,
   (b) assigning a first switching sequence to a first of said signal receivers,
   (c) assigning a different switching sequence to each other signal receiver which defines a non-redundant baseline with said first signal receiver,
   (d) assigning to each remaining signal receiver a switching sequence such that each signal receiver of a distinct pair of signal receivers which define a non-redundant baseline is assigned a different switching sequence and such that each signal receiver of at least one distinct pair of signal receivers which define a redundant baseline is assigned a different switching sequence,
   (e) assigning any of the selected switching sequence to the remaining of said signal receivers,
   (f) generating switch control signals indicating the switching sequences thus assigned to said signal receivers,
   (g) applying said switch control signals to switch means operative to connect said signal receivers to said polarization ports of the array elements following the assigned switching sequences.

2. The method as claimed in claim 1, wherein any of the switching sequences is replaced by its inverted switching sequence.

3. The method as claimed in claim 1, wherein said signal receivers comprise single channel signal receivers.

4. The method as claimed in claim 1, comprising the further step of:
   obtaining first, second, third, and fourth Stokes parameters from the output signals.

5. An aperture synthesis radiometer comprising:
   a plurality of signal receivers,
   a plurality of array elements each having horizontal and vertical polarization ports, said array elements being placed at different locations with a predetermined geometric configuration,
   switch means operative to connect the signal receivers to the polarization ports of said array elements,
   switch control means for controlling sequential switching operation of said switch means, said switch control means comprising means to select a particular switching sequence for each of said switch means and means for generating switch control signals for said switch means following the scheme in which:
   a different switching sequence is assigned to each signal receiver of each pair of signal receivers which define a non-redundant baseline in the array geometric configuration, and
   a different switching sequence is assigned to each signal receiver of at least one pair of signal receivers which define a redundant baseline in the array geometric configuration.

6. Apparatus as claimed in claim 5, wherein said signal receivers comprise single channel signal receivers.

7. Apparatus as claimed in claim 5, wherein:
   first, second, third, and fourth Stokes parameters are obtained from the output signals.

* * * * *